US006033618A

United States Patent
Gord et al.

[11] Patent Number: 6,033,618
[45] Date of Patent: Mar. 7, 2000

[54] PROCESS AND APPARATUS FOR PRODUCING A SEAMLESS CELLULOSE-BASED TUBULAR FILM BY EXTRUSION

[75] Inventors: Herbert Gord, Ingelheim; Klaus-Dieter Hammer, Mainz; Helmut Sattler, Wiesbaden, all of Germany

[73] Assignee: Kalle Nalo GmbH & Co. KG, Wiesbaden, Germany

[21] Appl. No.: 09/138,615

[22] Filed: Aug. 24, 1998

[30] Foreign Application Priority Data

Aug. 27, 1997 [DE] Germany ............................ 197 37 113

[51] Int. Cl.[7] .................................................. B29C 47/20
[52] U.S. Cl. .......................... 264/559; 264/194; 264/561; 264/562; 264/565
[58] Field of Search .................... 264/559, 560, 264/561, 562, 564, 565, 570, 572, 187, 194

[56] References Cited

U.S. PATENT DOCUMENTS

| 3,121,762 | 2/1964 | Hafstad et al. |
| 3,194,863 | 7/1965 | Williams, Jr. et al. |
| 3,450,806 | 6/1969 | Matsuo et al. |
| 3,821,339 | 6/1974 | Johnson ................................. 264/40 |
| 3,822,333 | 7/1974 | Haruta et al. |
| 4,123,589 | 10/1978 | Korlatzki et al. ...................... 428/425 |
| 4,145,532 | 3/1979 | Franks et al. .............................. 536/56 |
| 4,196,282 | 4/1980 | Franks et al. .............................. 536/56 |
| 4,255,300 | 3/1981 | Franks et al. .......................... 260/17.4 |
| 4,317,794 | 3/1982 | Gord et al. .............................. 264/559 |
| 4,536,365 | 8/1985 | Zwick ................................... 264/558 |
| 4,623,566 | 11/1986 | Kastl et al. ............................... 428/36 |
| 5,417,909 | 5/1995 | Michels et al. ..................... 264/177.13 |
| 5,607,639 | 3/1997 | Zikeli et al. ............................ 264/561 |
| 5,618,483 | 4/1997 | Weigel et al. .......................... 264/187 |

FOREIGN PATENT DOCUMENTS

| 2149218 | 3/1995 | Canada . |
| 0 662 283 A2 | 7/1995 | European Pat. Off. . |
| 0662 283A2 | 7/1995 | European Pat. Off. . |
| 0 686 712 A2 | 12/1995 | European Pat. Off. . |
| 0692 194A1 | 1/1996 | European Pat. Off. . |
| 218 104 | 1/1985 | Germany . |
| 274 435 | 12/1989 | Germany . |
| 298 789 B5 | 7/1994 | Germany . |
| 44 09 609 | 10/1994 | Germany . |
| 304 754A | 2/1930 | United Kingdom . |
| 93/13670 | 7/1993 | WIPO . |
| WO 95/07811 | 3/1995 | WIPO . |
| 95/35340 | 12/1995 | WIPO . |

*Primary Examiner*—Jan H. Silbaugh
*Assistant Examiner*—Mark Eashoo
*Attorney, Agent, or Firm*—Foley & Lardner

[57] ABSTRACT

A seamless cellulose-based tubular film is produced by extrusion of an aqueous cellulose-N-methylmorpholine N-oxide solution.

11 Claims, 3 Drawing Sheets

PROCESS AND APPARATUS FOR PRODUCING A SEAMLESS CELLULOSE-BASED TUBULAR FILM BY EXTRUSION

BACKGROUND OF THE INVENTION

1. Field of the Invention

The invention relates to a process and an apparatus for producing a seamless cellulose-based tubular film by extrusion of an aqueous cellulose-N-methylmorpholine N-oxide (NMMO) solution through an annular die into a spinning bath.

2. Description of the Related Art

Cellulose is insoluble in the customary solvents and has neither a melting point nor a melting range and can therefore not be melt-processed. For this reason, cellulose is usually chemically converted for producing tubular casing for foods, such as a sausage casings, these processes breaking down the cellulose, i.e. the average degree of polymerization of the cellulose is decreased. Processes of this type are technically very complex and are correspondingly expensive to operate.

The viscose process is currently preferred for the extrusion of cellulose-based tubular films. In this process, the cellulose is reacted with sodium hydroxide solution and then with carbon disulfide. This produces a cellulose xanthogenate solution which is extruded through a spinneret or annular die into a spinning bath or precipitation bath. The cellulose is regenerated using further precipitation and washing baths.

It has long been known that cellulose is soluble in oxides of tertiary amines. Currently, the most suitable solvent for cellulose is N-methylmorpholine N-oxide (NMMO). The cellulose dissolves therein without being modified chemically. No breakdown of cellulose chains takes place. The production of suitable spinning solutions has been disclosed (DD 218 104; DD 298 789; U.S. Pat. No. 4,145,532; U.S. Pat. No. 4,196,282; and U.S. Pat. No. 4,255,300).

Yarns may be produced from the solutions of NMMO by extrusion into a spinning bath (DE-A 44 09 609; U.S. Pat. No. 5,417,909). WO 95/07811 (=CA 2 149 218) also discloses a process for producing tubular cellulose films by the amine oxide process. This process features cooling the extruded film with a cooling gas immediately below the annular gap of the extrusion die. In accordance with EP-A 662 283, the extruded tubular film is cooled from the inside using liquid.

Recovery and purification of the NMMO is described in DD 274 435. Since the cellulose is not chemically modified in the process, less equipment is required. In the amine oxide process, no gaseous or aqueous waste products are produced, so that there are no problems with the exhaust air or waste water. Such processes are therefore becoming of increasing importance.

EP-A 0 686 712 describes the production of flexible cellulose fibres by the NMMO spinning process. In this process, a cellulose solution in water-containing NMMO is expressed through a spinneret, conducted through an air section into an NMMO-containing aqueous precipitation bath and then washed, after-treated, and dried.

According to WO 93/13670, a seamless tubular food casing is produced by extrusion of a solution of cellulose in NMMO/water using a special extrusion die. There is an air section between the extrusion die and precipitation bath. A feature of this process is a specially shaped hollow mandrel, through which the precipitation liquid can also circulate in the interior of the tube. In the air section, the interior of the extruded tube is virtually completely filled by a hollow mandrel and precipitation liquid. The tube is not stretched transversely in the course of this.

WO 95/35340 describes a process for producing blown cellulose films in which an underivatized cellulose which is dissolved in NMMO is used.

In the extrusion of a tubular film from an annular die into a spinning bath, the tubular film not being mechanically supported within this spinning bath, it is found to be disadvantageous that the accuracy of caliber of tubular film filled with an inner bath solution cannot be maintained, and irregular fluctuations in caliber diameter of the tubular film occur during the continuous extrusion process.

SUMMARY OF THE INVENTION

It is an object of the invention to provide an improved process of producing a tubular film of constant caliber, i.e., free of fluctuations in tube diameter, and without the necessity of use of mechanical supports and guides for the tubular film within the spinning bath.

It is also an object of the invention to provide an apparatus useful for producing such tubular film.

In accordance with these objectives, there is proved a process for producing a seamless cellulose tubular film comprising: extruding into a spinning bath an aqueous solution of cellulose and N-methylmorpholine N-oxide through an annular die to form a tubular film; transversely stretching the tubular film in an air section between the annular die and the surface of the spinning bath by overpressure; wherein the tubular film is filled with an inner bath solution and bent in the spinning bath; and wherein the level of the inner bath solution in submerging and ascending paths of the tubular film into the spinning bath is lower than the surface of the spinning bath.

There is also provided in accordance with the present invnetion an apparatus for producing a seamless cellulose-based tubular film by extrusion of an aqueous cellulose-N-methylmorpholine N-oxide solution which comprises: an annular die, a spinning vat for holding a spinning bath, an air section between the annular die and a surface of the spinning bath; near the bottom of the spinning vat a guide for guiding a tubular film to be submerging vertically in the spinning bath; and a feed tube and a suction tube for an inner bath solution of the tubular film passed through the annular die and capable of being projected into the tubular film.

Further objects, features and advantages of the present invention will become apparent from the detailed description that follow.

DETAILED DESCRIPTION OF THE PREFERRED EMBODIMENTS

Figure 1:
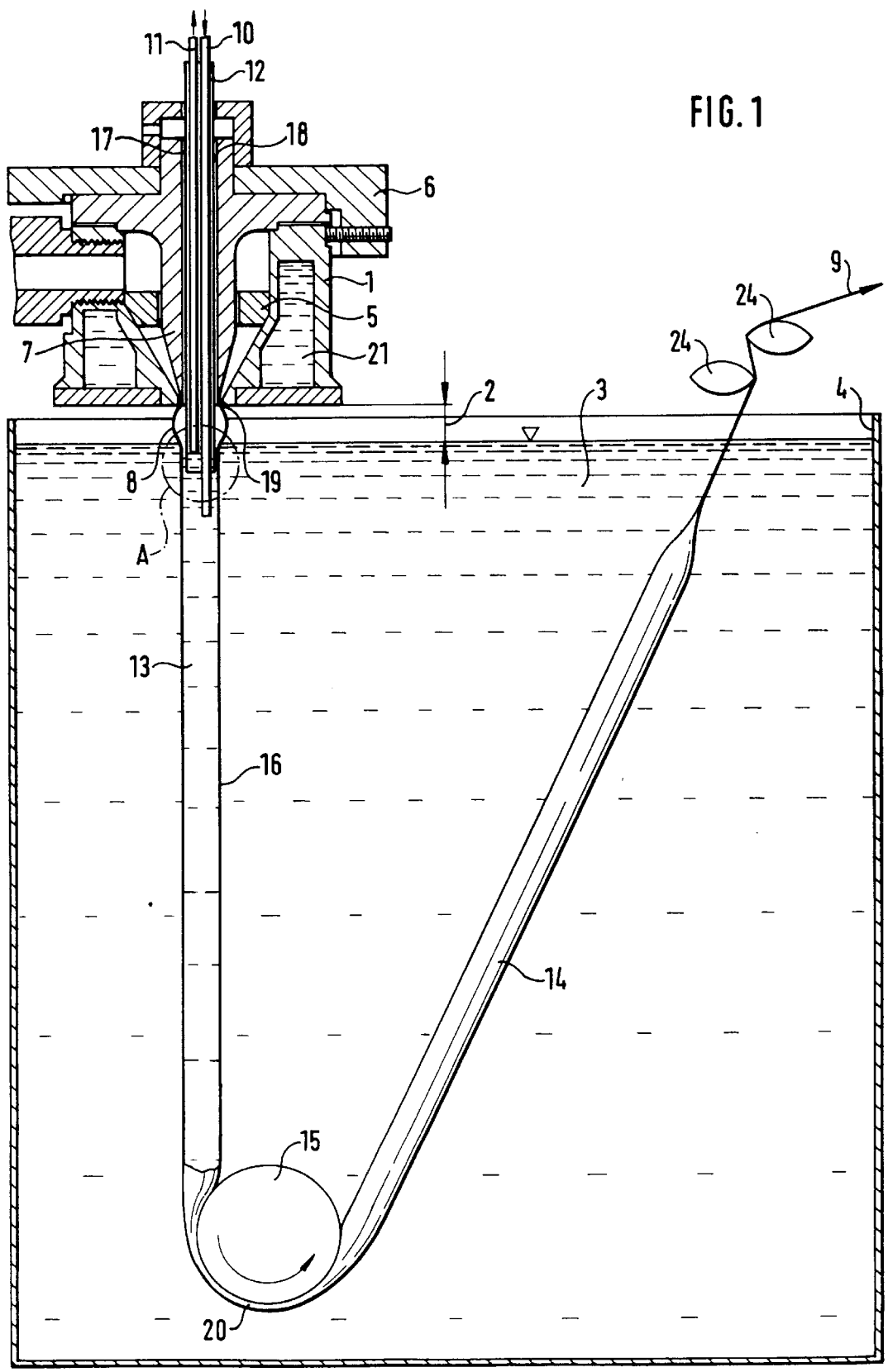
FIG. 1 shows a diagrammatic sectional view of an apparatus according to the invention having a feed tube in the high position in the tubular film.

The invention relates to a process of making a cellulose tubuler film by transversely stretching the tubular film in an air section between the annular die and the surface of the spinning bath by overpressure, the tubular film being filled with an inner bath solution and being bent in the spinning bath, and the level of the inner bath solution in the submerging and ascending parts of the tubular film being set lower than the surface of the spinning bath.

In a development of the process, the inner bath solution is both charged into the tubular film and removed by suction through the annular die, the charging and the removal by suction being carried out spatially separated from one another. The tubular film is guided in such a manner that the tubular film submerges vertically to the surface of the spinning bath and, after being bent within the spinning bath, is conducted upwards out of the spinning bath at an angle of 10 to 90° to the horizontal. In this context, according to the process, the density of the inner bath solution in the area of the bending of the tubular film is set to be lower than in the vertically submerging part of the tubular film and in the part which is conducted out at an angle of 10 to 90° to the horizontal.

In a development of the process, the spinning bath and the inner bath solution comprise N-methylmorpholine N-oxide (NMMO) in aqueous solutions and the NMMO concentrations of the spinning bath and of the inner bath solution are chosen to be about the same at the beginning of the extrusion of the tubular film. The NMMO concentration of the inner bath solution increases during the extrusion process in the direction of the area of bending of the tubular film and at first also increases with respect to the NMMO concentration of the spinning bath and is decreased to a value less than or equal to the initial concentration by constant renewal of the inner bath solution.

In a development of the process, the tubular film is conducted through the spinning bath without inner and/or outer support.

In a development of the process, the bath solution is removed by suction in a tube in such a manner that the level of the inner bath solution in the tube is lower than the level of the inner bath solution in the tubular film, and wherein the tube has a smaller diameter than the tubular film.

In a development of the process, the inflow of the inner bath solution is controlled in a height-adjustable manner within the submerging tubular film, and the inner bath solution is removed by suction in such a manner that a level of the inner bath solution is established at a distance of 3 to 45 mm below the level of the inner bath solution in the submerging tubular film.

In a development of the process the tubular film is transversely stretched in the air section at an overpressure of 0.5 to 2.0 mbar.

In a development of the process, the annular die is heated to the temperature of the cellulose-NMMNO solution.

An apparatus is also provided for producing a seamless cellulose-based tubular film by extrusion of an aqueous cellulose—N-methylmorpholine N-oxide (NMMO) solution. The apparatus comprises an annular die and a spinning bath, an air section is present between the annular die and the surface of the spinning bath in a spinning vat, near the bottom of the spinning vat there is disposed a guide for the tubular film submerging vertically into the spinning bath, and a feed tube and a suction tube for an inner bath solution of the tubular film are passed through the annular die and project into the tubular film.

In a further development of the apparatus, a tube encloses the feed and suction tube, passes centrally through a center sleeve of the annular die and forms a gap with a central passageway of the center sleeve, the tube submerging into the inner bath solution of the tubular film and having a smaller diameter than the tubular film.

In a development of the invention, the feed tube is height-adjustable within the vertically incoming tubular film. Expediently, the feed tube adopts an upper position at the beginning of charging the inner bath solution into the tubular film and, when charging the inner bath solution is completed, is slid into the tubular film into a position just above the guide.

In a development of the invention, the tube is submerged 5 to 50 mm, and the suction tube 3 to 45 mm, in the inner bath solution. Suitably, the guide is a porcelain or glass rod whose diameter is greater than the caliber of the tubular film.

In a development of the invention, the apparatus includes an extrusion die gap of the annular die that has a diameter greater than the outer diameter of the tube, where air is capable of flowing into the tubular film through the gap at overpressure and expands and transversely stretches the tubular film within the air section.

In a development of the apparatus, the spinning bath solution and the inner bath solution are aqueous N-methylmorpholine N-oxide solutions which, at the start of the extrusion of the tubular film have equal N-methylmorpholine N-oxide concentrations.

In a development of the apparatus, during extrusion of a tubular film, the feed tube is capable of being in a position just above the guide, whereby the inner bath solution flowing into the tubular film dilutes the elevated N-methylmorpholine N-oxide concentration of the inner bath solution in the area of the guide to a concentration which is less than or equal to the N-methylmorpholine N-oxide concentration of the spinning bath.

In a development of the apparatus, the apparatus is adapted such that the tubular film is constricted by the spinning bath along a contact section on the guide.

In a development of the apparatus, the apparatus comprises a heating medium to heat the annular die wherein the heating medium flows through the annular die.

In a development of the apparatus, the apparatus is adapted such that wherein a tubular film which is ascending upwards at an incline after detachment from the guide is filled with the inner bath solution and has the same caliber as the vertically submerging tubular film and the spinning bath presses flat the ascending tubular film below the surface of the spinning bath.

In a develoment of the invention, the air section is 10 to 100 mm in length.

The invention is described in more detail below with reference to an illustrative example shown in the drawings. An apparatus shown in FIG. 1 for the extrusion of an aqueous cellulose-N-methylmorpholine N-oxide (NMMO) solution to form a tubular film comprises an annular die 1 and a spinning vat 4 which is filled with a spinning or precipitation bath 3. The spinning bath 3 includes an aqueous NMMO solution preferably having an NMMO content of 12 to 20% strength by weight, in particular 15% strength by weight.

The annular die 1 known per se comprises a preliminary distributor disk 5, an adjustment device 6, a center sleeve 7 having a central passageway 18 and an extrusion die gap 19. The aqueous spinning solution to be extruded to form a tubular film is an NMMO solution generally having 75 to 90% by weight, in particular 87.7% by weight, NMMO content, based on the weight of the solution. The spinning solution is introduced from one side into the annular die 1 by means of a spinning pump which is not shown. The preliminary distributor disk in the annular die 1 ensures a potentially uniform feed over the periphery of the NMMO solution into the extrusion die gap 19. The fine adjustment of the tubular film thickness is made by the adjustment device 6 of the center sleeve 7.

The annular die 1 has a jacket for heating the annular die 1 to the temperature of the NMMO solution, a heating medium 21 which flows through the jacket being provided for the heating. The tubular film extruded from the die gap 19 passes through an air section 2 in which it is expanded and transversely stretched by means of compressed air. The expanded tubular film 8 has no contact with the exterior of a tube 12 which is passed through the passageway 18 of the center sleeve 7 and extended downwards beyond the lower side of the annular die 1.

Figure 2:
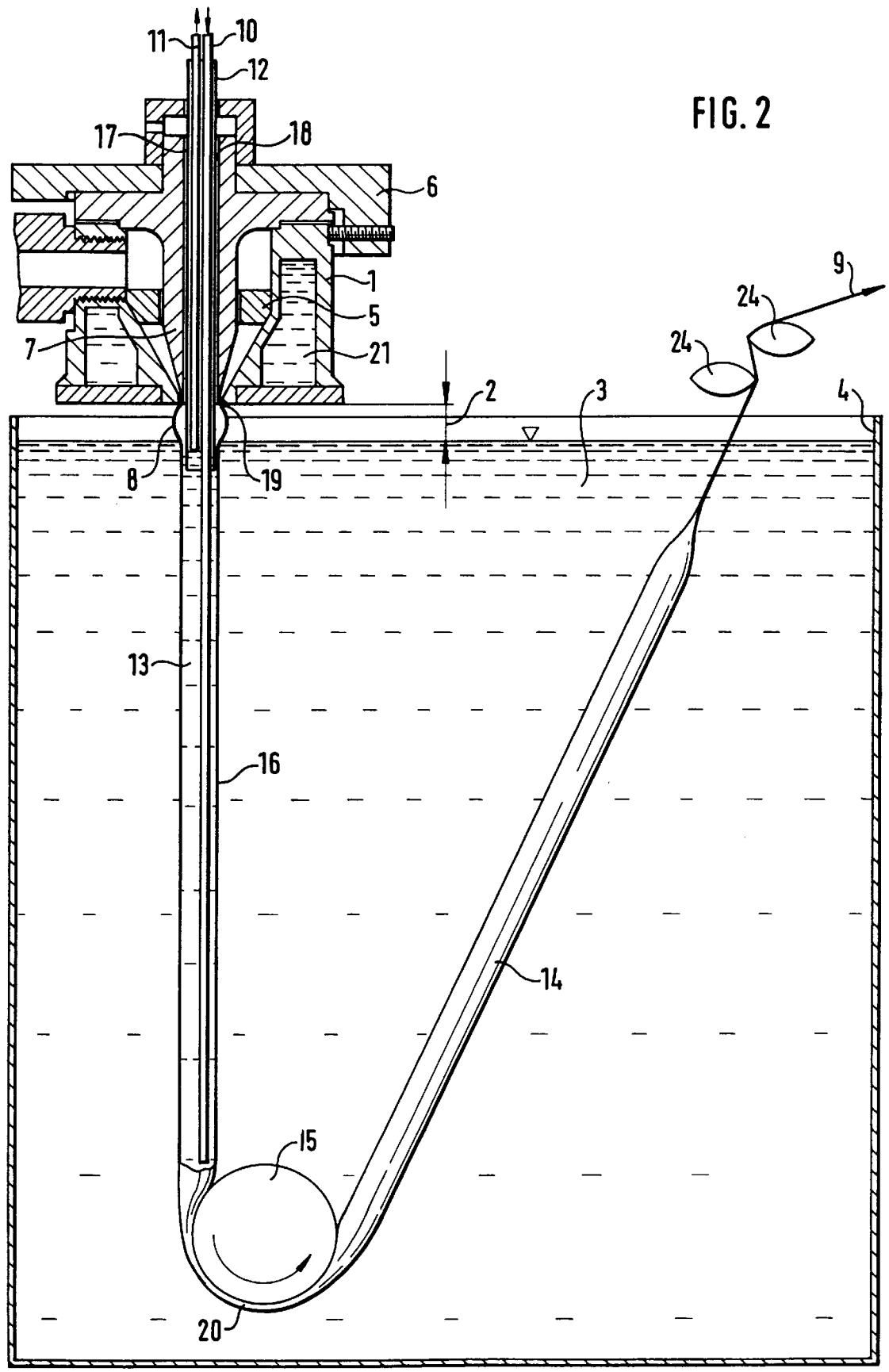
FIG. 2 shows a diagrammatic sectional view of an apparatus similar to that according to FIG. 1 having a feed tube slid into the tubular film.

The air section is generally 10 to 100 mm. The tube 12 surrounds a feed tube and an outlet tube 10 and 11, respectively, for an inner bath solution 13 which is charged into the tubular film. This inner bath solution 13 is likewise an aqueous NMMO solution containing generally 12 to 20% by weight, in particular 15% by weight, NMMO. The feed tube and suction tube 10 and 11, respectively, project into the tubular film 16 submerging vertically downward into the spinning bath 3. At the beginning of charging the inner bath solution 13 into the tubular film 16, the feed tube 10 adopts an upper position, as shown in FIG. 1. As soon as the tubular film is filled with the inner bath solution, the feed tube 10 is slid into the tubular film 16 into a position which is just above a guide 15 for the tubular film 16, as can be seen in FIG. 2. The feed tube 10 is height-adjustable within the vertically submerging tubular film 16, as is likewise the suction tube 11.

The tube 12 forms a gap 17 together with the wall of the passageway 18, and through this gap 17 air at an overpressure of 0.5 to 2.0 mbar is passed into the tube interior. This overpressure effects the expansion of the tubular film in the air section 2 immediately after its exit from the extrusion die gap 19. The diameter of the extrusion die gap 19, which is an annular gap, is greater than the outer diameter of the tube 12. The tubular film 16 submerging in the spinning bath 3 is bent in the vicinity of the bottom of the spinning vat 4. For this purpose a guide 15, which is a porcelain or glass rod, is disposed, around which the tubular film 16 is lead.

After the guide, the tubular film is conducted upwards out of the spinning bath at an angle of 10 to 90° to the horizontal within the spinning bath 3. The tubular film 14 running upwards is squeezed together just below the surface of the spinning bath by the internal pressure of the spinning bath and is lead out of the spinning bath in the folded state. Scrapers 24 on both sides of the folded tubular film 14 scrape the excess spinning bath solution off on both sides and the width of the flattened tubular film 9 downstream of the scrapers in the vicinity of the exit from the spinning vat 4 is used as a control parameter for the overpressure of the air in the gap 17. Each deviation of the width of the flattened tubular film 9 from a preset value effects a readjustment of the over-pressure in such a manner that a deviation downwards increases the air pressure in the gap 17 and a deviation upwards lowers the air pressure in the gap 17.

FIG. 2 differs from FIG. 1 only in that the feed tube 10 in FIG. 2, in contrast to FIG. 1, is slid into the vertically submerging tubular film 16 until the opening of the feed tube is just above the guide 15.

The spinning bath 3 and the inner bath solution 13 are, as mentioned above, aqueous NMMO solutions which have equal NMMO concentrations at the beginning of extrusion of the tubular film 16. As the extrusion proceeds, the NMMO concentration of the inner bath 13 will first increase, since NMMO, during the cellulose regeneration, enters from the tubular film into the inner bath solution 13 and accumulates there. Since NMMO has a higher density than water, the concentration and density of the NMMO solution increases within the tubular film 16 towards the guide 15. Since, on the other hand, the concentration of the NMMO solution of the spinning bath 3 virtually does not change, since the NMMO given off from the tubular film to the spinning bath 3, on account of the large volume difference between tubular film and spinning bath, can only elevate the NMMO concentration of the spinning bath 3 to a negligibly small extent, differently from the case with the inner bath solution 13 in the tubular film 16, without control of the NMMO concentration of the inner bath solution 13, there would be an extension of the tubular film 16.

Owing to the continuous feed and removal by suction of the inner bath solution 13 via the feed and suction tubes 10 and 11, respectively, there is a constant renewal of the inner bath solution 13, i.e. the NMMO-enriched inner bath solution 13 is diluted in the vicinity of the guide 15, so that the NMMO concentration of the inner bath solution 13 in the vicinity of the guide 15 is less than or at most equal to the NMMO concentration of the spinning bath 3. As a result, the pressure of the spinning bath 3 is sufficient to compress the tubular film 16 onto the guide 15 along a contact section 20 to the extent that it is more or less pressed flat, as can be seen from FIGS. 1 and 2. As a result, in the tubular film, over its entire length from just below the surface of the spinning bath 3 to the vicinity of the guide 15, constant pressure conditions are established which ensure that the caliber or diameter of the tubular film 16 is constant and does not have any fluctuations or dents. The density of the inner bath solution 13 is thus a function of the throughput of inner bath solution or NMMO solution, the inner bath volume and the submersion depth of the feed tube 10 or the feed point of fresh NMMO solution into the inner bath solution 13. The position or point at which the inner bath solution 13 flows into the tubular film 16 essentially effects the constancy of caliber, the inner bath height in the ascending tubular film 14 downstream of the guide 15 and the point for removal of the inner bath solution 13 from the interior of the tubular film.

Figure 3:
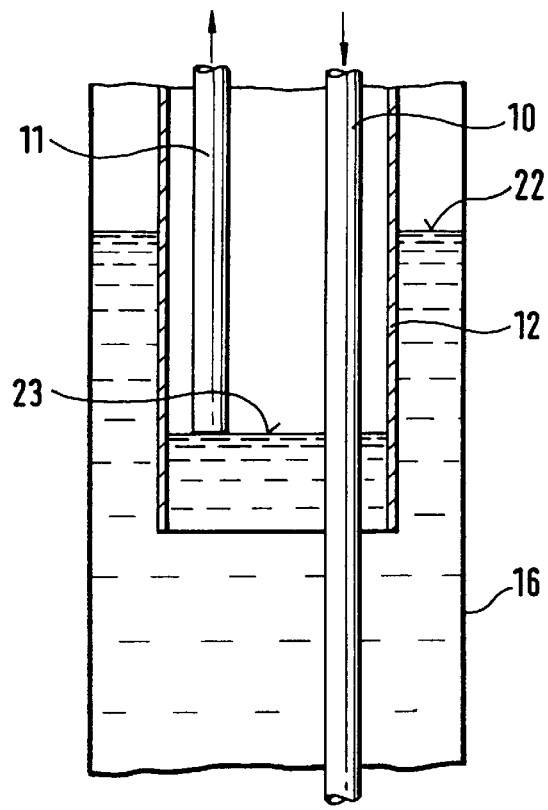
FIG. 3 shows an enlarged sectional view of position A in FIG. 1.

FIG. 3 shows the detail corresponding to position A in FIG. 1 in an enlarged scale. The tube 12 is submerged about 5 to 50 mm in the inner bath solution 13 in the interior of the tubular film. The suction tube 11 is situated in a position at which a level 23 within the tube 12 is established which is lower than a level 22 of the inner bath solution outside the tube 12. The suction tube 11 is submerged about 3 to 45 mm in the inner bath solution 13. In other words, this means that the suction tube 11 adopts a position in which the inner bath solution 13 is removed by suction in such a manner that the level 23 is established at a distance of 3 to 45 mm below the level 22 of the inner bath solution in the submerging tubular film 16. The removal by suction thus begins below the surface of the spinning bath 3, so that the air section 2 and the pressure conditions prevailing there have no influence on the inner bath solution 13 and thus caliber fluctuations of the tubular film 16 can not occur either.

The setting of the submersion depth of the feed tube 10 and the constant renewal of the inner bath solution keeps the density of the inner bath solution 13 at a constant value which leads to the constriction of the tubular film 16 along the contact section 20 of the guide 15 and the inner bath 13 in the ascending tubular film 14 being established at a constant level below the surface of the spinning bath 3 for any running time, so that unsteady running and fluctuations in caliber of the tubular film no longer occur. The constant renewal or minimum feed rate of inner bath solution 13 must be determined separately for each extrusion or take-off speed of the tubular film.

The tubular film 14 exiting from the spinning bath 3 then runs through precipitation and washing vats which are not shown, and can, for example, be further treated with plasticizers and then dried before it is wound up and further processed.

Figure 4:
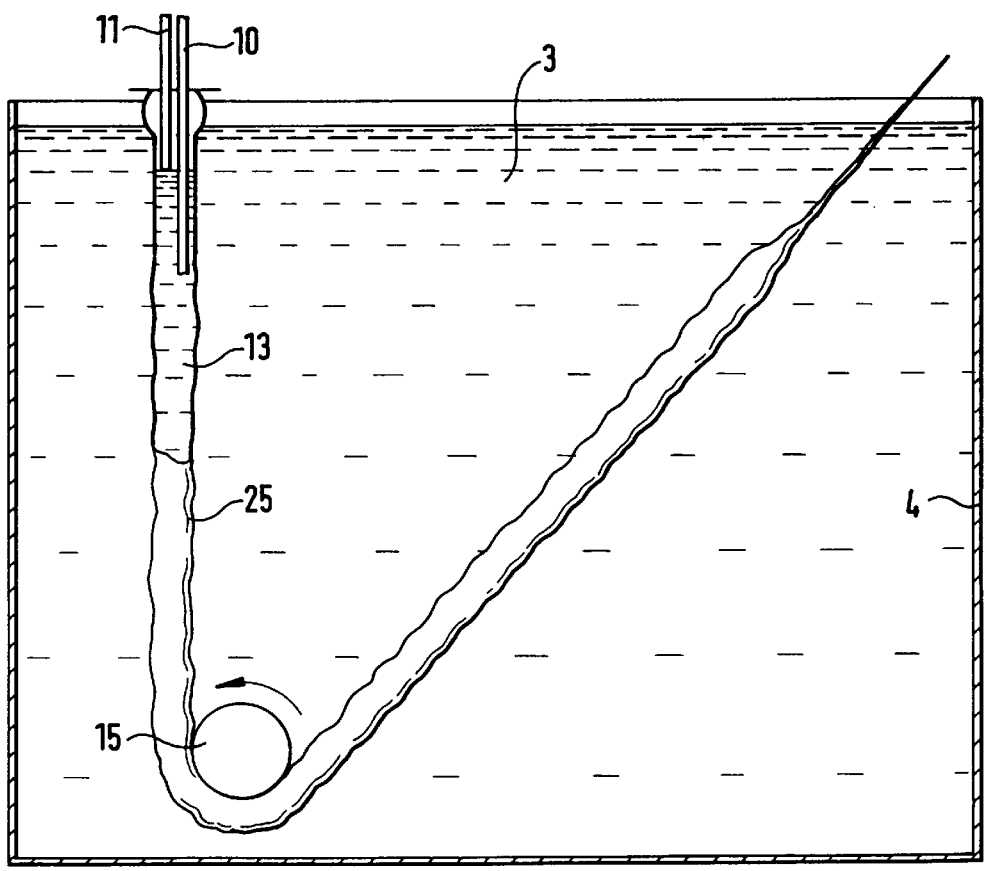
FIG. 4 shows diagrammatically a section of a tubular film having fluctuations in caliber.

FIG. 4 indicates diagrammatically the fluctuations in caliber of a tubular film 25 which result from renewal of the inner bath solution not taking place in such a manner that fresh NMMO solution is introduced into the inner bath solution 13 in the vicinity of the guide 15 via the inserted feed tube. Because of the lack of replacement of the inner bath solution 13, the NMMO concentration in the tubular film increases downwards and reaches a highest value in the vicinity of the guide 15. This increase in density of the inner bath solution expands the tubular film 25 in the area of the guide 15, so that non-uniform calibers occur over the length of the tubular film. However, these caliber fluctuations are not restricted to the area of the guide 15, but occur as soon as the start of entry of the tubular film 25 into the spinning bath solution 3. An explanation of this is that the feed tube 10 adopts an upper position, so that, owing to the feed of fresh NMMO solution, an insufficiently high density of the inner bath solution 13 is already established in the upper part of the tubular film 25 and increases up to the guide 15. The excessive density of the inner bath solution 13 at the guide 15 leads to the tubular film 25 at times having no contact with the guide 15 and, as a result, having an uneven speed which is observed as caliber fluctuation in the tubular film 25 (looks like a chain of eggs).

German Application 197 37 113.2 filed Aug. 27, 1997 (the foreign priority application of the present application) is hereby incorporated by reference in its entirety.

Although only a few exemplary embodiments of this invention have been described in detail above, those skilled in the art will readily appreciate that many modifications are possible in the exemplary embodiments without materially departing from the teachings and advantages of this invention. Accordingly, all such modifications are intended to be included within the scope of this invention.

What is claimed is:

1. A process for producing a seamless cellulose tubular film comprising:

extruding into a spinning bath an aqueous solution of cellulose and N-methylmorpholine N-oxide through an annular die to form a tubular film;

transversely stretching the tubular film in an air section between the annular die and the surface of the spinning bath by overpressure;

wherein the tubular film is filled with an inner bath solution and bent in the spinning bath; and wherein the level of the inner bath solution in submerging and ascending paths of the tubular film into the spinning bath is lower than the surface of the spinning bath.

2. A process as claimed in claim 1, wherein the inner bath solution is both filled into the tubular film and removed by suction through the annular die, and wherein the filling and the removal are performed spatially separate from each other.

3. A process as claimed in claim 2, wherein the bath solution is removed by suction in a tube in such a manner that the level of the inner bath solution in the tube is lower than the level of the inner bath solution in the tubular film, and wherein the tube has a smaller diameter than the tubular film.

4. A process as claimed in claim 2, wherein the inflow of the inner bath solution is controlled in a height-adjustable manner within the submerging tubular film, and the inner bath solution is removed by suction in such a manner that a level of the inner bath solution is established at a distance of 3 to 45 mm below the level of the inner bath solution in the submerging tubular film.

5. A process as claimed in claim 1, wherein the tubular film submerges vertically to the surface of the spinning bath and, after being bent within the spinning bath, is lead out upwards from the spinning bath at an angle of 10 to 90° to the horizontal.

6. A process as claimed in claim 5, wherein the density of the inner bath solution in an area of the bending of the tubular film is lower than in the vertically submerging part and in the part of the tubular film which is led out at an angle of 10 to 90° to the horizontal.

7. A process as claimed in claim 1, wherein the spinning bath and the inner bath solution comprise N-methylmorpholine N-oxide in aqueous solution, and the N-methylmorpholine N-oxide concentrations of the spinning bath and the inner bath solution are from the same size at the start of the extrusion of the tubular film.

8. A process as claimed in claim 7, wherein the N-methylmorpholine N-oxide concentration of the inner bath solution increases during the extrusion process in the direction of an area of bending of the tubular film, and at first also increases with respect to the N-methylmorpholine N-oxide concentration of the spinning bath and is decreased to a value less than or equal to the initial concentration by constant renewal of the inner bath solution.

9. A process as claimed in claim 1, wherein the tubular film is conducted through the spinning bath without inner and outer supports.

10. A process as claimed in claim 1, wherein the tubular film is transversely stretched in the air section at an overpressure of 0.5 to 2.0 mbar.

11. A process as claimed in claim 1, wherein the annular die is heated to the temperature of the solution of cellulose and N-methylmorpholine N-oxide solution.

* * * * *